Feb. 4, 1969  F. N. REYNOLDS  3,425,101
COVERED TRIM BUTTON
Filed Feb. 23, 1967

INVENTOR
Frederick N. Reynolds
BY Walter S. Murray
ATTY.

United States Patent Office 3,425,101
Patented Feb. 4, 1969

3,425,101
COVERED TRIM BUTTON
Frederick N. Reynolds, Augusta, Ky., assignor to The F. A. Neider Company, Augusta, Ky., a corporation of Kentucky
Filed Feb. 23, 1967, Ser. No. 617,964
U.S. Cl. 24—113
Int. Cl. A44b *1/12, 1/14*
2 Claims

ABSTRACT OF THE DISCLOSURE

A covered trim button for upholstery and for interior trim in automobile bodies. Structure that reduces bulging of the covering material at the bottom of the trim button.

---

This invention relates to covered trim buttons and is particularly concerned with trim button constructions adapted to be covered with plastic materials which are relatively bulky and less pliable than fabrics conventionally used as covers for this type of button.

It has been the practice in the manufacture of trim buttons to provide a cup-shaped cap member having a downturned, annular rim over which a flexible covering material was stretched, said button having an annular mounting base that fitted within the cap rim, the peripheral portion of the material being folded around the cap rim edge and turned upwardly between the cap rim and the periphery of the base, with the rim edge being deformed radially beneath the periphery of the base to provide a unitary trim button. When heavier and stiffer plastics were used as these trim button covers there occurred an unsightly bulge of folded material around the edge of the deformed cap rim, as it was at this radially restricted area that the greatest amount of material became bunched.

It is therefore an object of this invention to provide a novel means of relieving the bulging and bunching of covering material at the place where it is gathered around the deformed cap rim edge of a trim button.

Another object of the invention is to reduce the bulging and bunching of relatively heavy and less pliable material, by forming a row of angularly disposed relief spaces in the cap rim edge which, when the cap rim edge is deformed radially toward operative position, will provide spaced apart openings for the reception of the gathered material and thus prevent unsightly bulging and bunching of the material at the cap rim edge.

Other objects of the invention will become apparent from the following specification taken in conjunction with the accompanying drawings, wherein.

Figure 1:
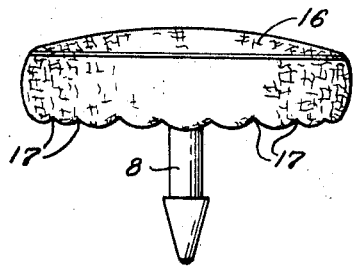
FIG. 1 is a side elevational view of my covered trim button.
Figure 2:
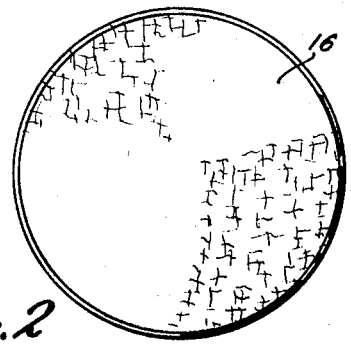
FIG. 2 is a top plan view of the button shown in FIG. 1.

Referring now in detail to the drawings, the numeral 6 represents a base member having an annular marginal flange 7 extending upwardly therefrom, said flange preferably being semicircular in lateral section. A mounting stem 8 is clinched to the central part of the base member 6 and projects downwardly therefrom, the base being strengthened by a number of radially extending detents 9 formed as by stamping therein.

Figure 5:
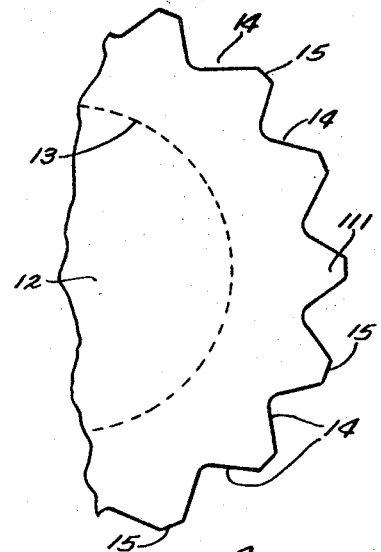
FIG. 5 is a fragmental, plan view of a sheet metal blank from which the cap member of my button is made.
Figure 4:
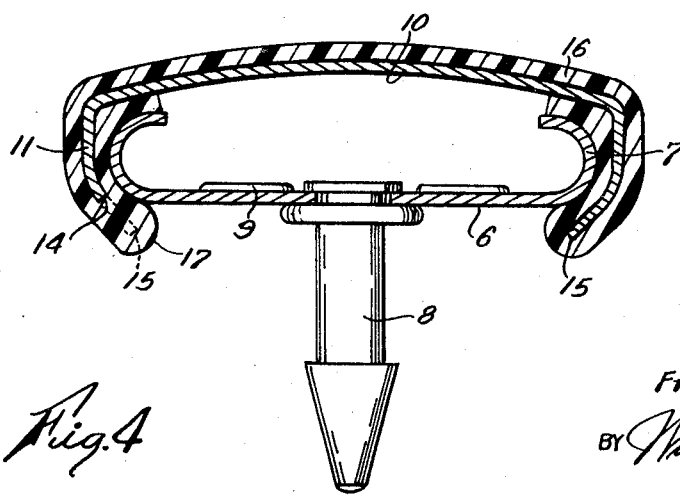
FIG. 4 is an enlarged section taken on line 4—4 of FIG. 3.

A cup-shaped cap member 10 has a downturned annular rim 11 that receives and fits around the marginal flange 7 of the base member 6, said cap member being preferably formed from a metal blank 12 (FIG. 5), said blank being turned downwardly on the dotted lines 13 to form the rim 11. As best shown in FIG. 5, the peripheral edge portion 111 of the blank 12 has a number of unconnected, spaced apart V-shaped notches formed therein to present in the cap rim edge a row of angularly disposed relief spaces 14, adjacent notches being connected by a flat edge portion 15 of the cap rim.

A covering material 16 that is made from plastic material and which is relatively bulky and less pliable than conventional fabric covers extends over the cap; the outer surface of the cap rim 11, is folded around the serrated rim edge, and upwardly between the marginal flange 7 of the base and the inner surface of the rim 11, the lower serrated edge portion of the rim being deformed radially inwardly to provide a unitary construction for the trim button.

Figure 3:
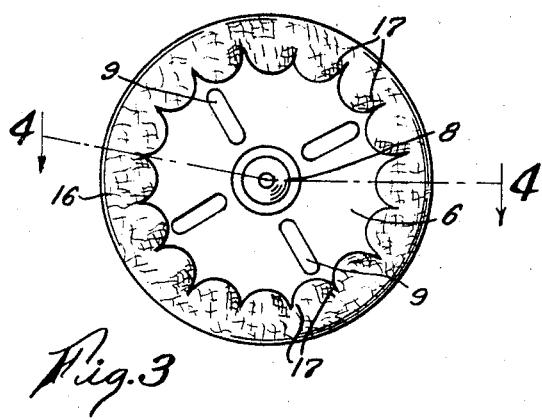
FIG. 3 is a bottom plan view of the trim button shown in FIG. 1.

As will best be seen in FIGS. 1 and 3 of the drawings, the covering material, which is folded around the deformed cap rim edge, is drawn into the relief notches 14 in spaced apart gathered areas 17, thus materially reducing the bunching of material around the cap rim edge and reducing the bulkiness of the button material at this critical area where the covering is usually most radially restricted, and thus presents the greatest amount of gathered covering material.

It will therefore be understood that I have provided a covered trim button which materially reduces the bunching up of material around the cap rim edge beneath the bottom of the mounting base, while providing a non-penetrating, yet good fastening means for holding the cover material stretched over the cap and locked in position around the base when the button becomes a unitary structure.

What is claimed is:
1. A covered trim button comprising a base member having a peripheral edge portion, an annular marginal flange projecting from the peripheral edge portion of the base member, a cup-shaped cap member having a downturned rim encircling the marginal flange of the base member, a covering extending over the cap and the cap rim and folded around the cap rim edge portion and between the marginal flange of the base member and the inside surface of the cap rim, said cap rim edge portion being formed with a series of angularly spaced apart V-shaped teeth, said teeth on the cap rim edge portion being permanently deformed radially inwardly around and under the bottom of the marginal flange of the base member, whereby, during assembly, portions of the covering material are clamped between said marginal flange and said cap rim, so that gathered areas of the covering material are first drawn into the spaces between adjacent teeth and then pinched between adjacent teeth to reduce bulging of the material folded around the cap rim edge portion.

2. A covered trim button as set forth in claim 1 characterized by the fact that the free ends of the teeth are blunted to prevent piercing of the covering material when the material is drawn over the cap rim into operative position.

References Cited

UNITED STATES PATENTS 202,907   4/1878   Wheeler et al. _____ 24—92

FOREIGN PATENTS 814,530   9/1951   Germany.
507,295   6/1939   Great Britain.

BOBBY R. GRAY, *Primary Examiner.*

E. SIMONSEN, *Assistant Examiner.*

UNITED STATES PATENT OFFICE
CERTIFICATE OF CORRECTION

Patent No. 3,425,101                                                         February 4, 1969

Frederick N. Reynolds

It is certified that error appears in the above identified patent and that said Letters Patent are hereby corrected as shown below:

Column 2, line 37, cancel "having a peripheral edge portion, an annular marginal" and insert the same between lines 38 and 39 , same column 2.

Signed and sealed this 17th day of March 1970.

(SEAL)
Attest:

Edward M. Fletcher, Jr.                                WILLIAM E. SCHUYLER, JR.
Attesting Officer                                            Commissioner of Patents